(12) United States Patent
Matsumoto et al.

(10) Patent No.: US 6,481,077 B1
(45) Date of Patent: Nov. 19, 2002

(54) CARRYING APPARATUS FOR AUTOMOBILE DASH MODULE

(75) Inventors: Masashi Matsumoto, Sagamihara (JP); Masanobu Suzuki, Ayase (JP)

(73) Assignee: Nissan Motor Co. Ltd., Kanagawa (JP)

( * ) Notice: Subject to any disclaimer, the term of this patent is extended or adjusted under 35 U.S.C. 154(b) by 117 days.

(21) Appl. No.: 09/721,714

(22) Filed: Nov. 27, 2000

(30) Foreign Application Priority Data

Dec. 10, 1999 (JP) ............................................. 11-352329

(51) Int. Cl.[7] ........................... B25B 27/14; B63Q 3/00; B65H 1/00
(52) U.S. Cl. ........................ 29/271; 29/468; 414/225.01
(58) Field of Search ........................... 29/468, 271, 433, 29/464, 407, 787, 430; 296/70; 180/90; 206/335; 81/57.24, 57.35; 414/225.01

(56) References Cited

U.S. PATENT DOCUMENTS

| 5,456,002 A | 10/1995 | Barnhart et al. | ............... 29/787 |
| 5,477,603 A | 12/1995 | Kemichick | .................... 29/468 |

FOREIGN PATENT DOCUMENTS

JP          6-87476 A       3/1994

Primary Examiner—Gregory M Vidovich
Assistant Examiner—John C. Hong
(74) Attorney, Agent, or Firm—Shinjyu Global IP Counselors, LLP (57) ABSTRACT

A carrying apparatus for carrying an automobile dash module to an interior of a vehicle includes a support portion, a sliding part, and a fixing part. The support portion is configured and adapted to carry the dash module into the interior of the vehicle through a door opening of a vehicle body. The support portion includes a main frame that extends in a direction that is substantially parallel to a direction of a length of the dash module supported by the support portion. The sliding part is slidably coupled to the main frame to slide in the longitudinal direction of the main frame. The fixing part is configured and adapted to be fixed to a predetermined portion of a periphery of the door opening. The fixing part is coupled to the sliding part and configured to engage a portion of the vehicle body so that the main frame and said sliding part can pivot about an axis oriented in a vertical direction relative to the vehicle body. With the carrying apparatus of the present invention, it is easy to carry a dash module having various components surrounding a dash into the interior of a vehicle, even after doors are attached to the vehicle body.

16 Claims, 6 Drawing Sheets

CARRYING APPARATUS FOR AUTOMOBILE DASH MODULE

BACKGROUND OF THE INVENTION

1. Field of the Invention

This invention generally relates to a carrying apparatus and a carrying method for an automobile dash module that has various components installed therein. More specifically, the present invention relates to a carrying apparatus and a carrying method for carrying an automobile dash module into an interior of a vehicle through an open door of the vehicle.

2. Background Information

In a conventional vehicle assembly process for automobiles, various components surrounding a dash of the vehicle body, such as air-conditioning unit, ducts, instrument panel, audio unit, and electrical system have been mounted to a vehicle body component by component. In recent years, an alternative method has been adopted wherein various components surrounding a steering member are preassembled to form a module, such that all the components can be installed by carrying and mounting the module into the vehicle interior. Since dash module and components surrounding the dash are well known in the art, the structure and function of the dash module and components surrounding the dash would be obvious to one of ordinary skill in the art without further explanation herein.

Since the steering member itself has roughly the same length as a traverse dimension of the vehicle interior, the above described module also has a length that is at least as long as the traverse dimension of the vehicle interior. Besides, after mounting various components on the steering member, the module is quite heavy. Therefore, it is difficult to carry the module to its proper mounting position. Consequently, where the vehicle body is transported by a conveyor on a vehicle body manufacturing line, an arm-type assisting apparatus that moves in synchronization with the vehicle body has been utilized to carry and install the module to a prescribed position of the vehicle body.

Laid-Open Japanese Patent Publication No. 6-87476 discloses an apparatus in which an arm is slung from a guide rail. A support portion that holds a module is mounted to a lower end of the arm. Accordingly, the module is carried into the vehicle interior by moving the arm and module along the guide rail.

However, the module is difficult to install since the module is large in size due to various components installed therein. Moreover, the module is also difficult to maneuver since the gap between the module and the door opening tends to be small, especially when the module enters the vehicle interior through the door opening. Therefore, when the module is carried into the vehicle interior in the aforementioned manner, the operator needs to perform a complicated operation to avoid interference between the module and the door opening. The module carrying path becomes particularly complicated in the case of a vehicle body to which doors have already been mounted. In particular, even when a door is fully opened with respect to a vehicle body, a dash module must gradually pivot in a clockwise direction from a diagonal orientation with respect to vehicle body while being transported in the frontward direction of the vehicle. The carrying operation is further complicated by the fact that positions of the vehicle bodies on the conveyor are not always consistent. Consequently, the positional relationship between the vehicle body and the assisting apparatus which moves in synchronization with the conveyor varies.

In view of the above, there exists a need for a carrying apparatus and a carrying method which overcome the above mentioned problems in the prior art. This invention addresses this need in the prior art as well as other needs, which will become apparent to those skilled in the art from this disclosure.

SUMMARY OF THE INVENTION

An object of the present invention is to provide a carrying apparatus with which a module can be carried into a vehicle interior easily even when doors are attached to the vehicle body.

Another object of the present invention is to provide a method of carrying into a vehicle interior a module easily even when doors are attached to the vehicle body.

In order to achieve the aforesaid objects, the present invention provides a carrying apparatus for carrying an automobile dash module to an interior of a vehicle. The carrying apparatus includes a support portion, a sliding part, and a fixing part. The support portion is configured and adapted to carry the dash module into the interior of the vehicle through a door opening of a vehicle body. The support portion includes a main frame. The main frame extends in a direction that is substantially parallel to a direction of a length of the dash module supported by the support portion. The sliding part is slidably coupled to the main frame to slide in the longitudinal direction of the main frame. The fixing part is coupled to the sliding part and configured to engage a predetermined portion of the vehicle body so that the main frame and the sliding part pivot about an axis oriented in a vertical direction relative to the vehicle body.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only, and not for the purpose of limiting the invention as defined by the appended claims and their equivalents.

First Embodiment

Figure 1:
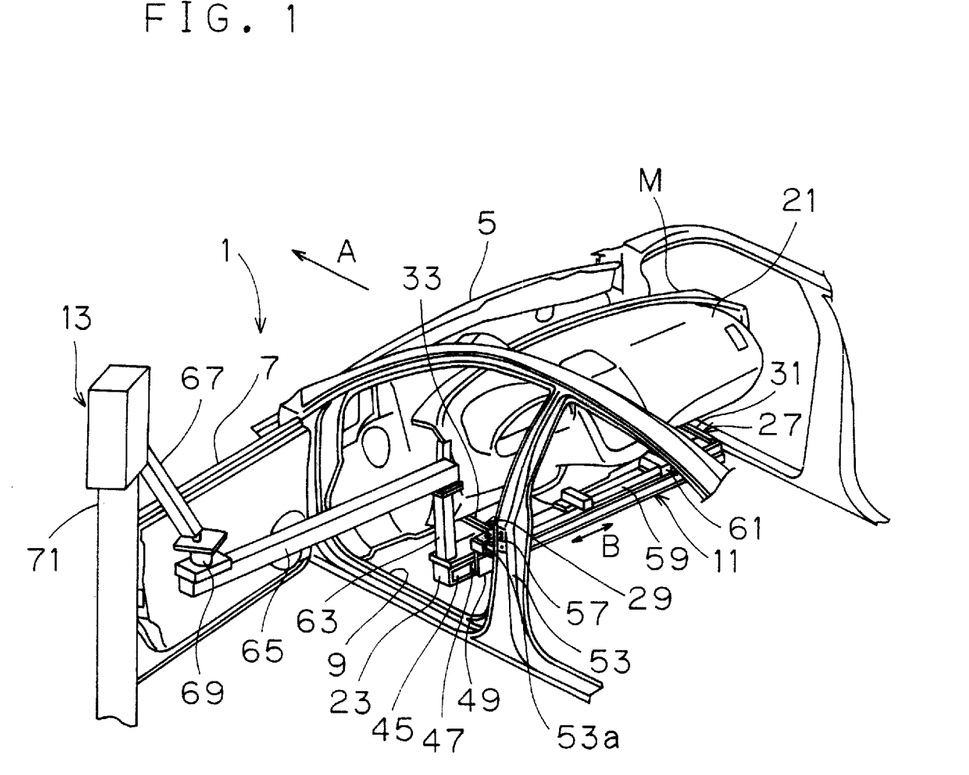
FIG. 1 is a perspective view of a carrying apparatus in accordance with the first embodiment of the present invention, in which an automobile dash module is carried into the interior of an automobile.

FIG. 1 illustrates a carrying apparatus 1 for an automobile dash module M in accordance with the first embodiment of the present invention, in which carrying apparatus 1 is carrying dash module M into the interior of a vehicle. In FIG. 1, a door 7 is mounted to a vehicle body 5. Accordingly, dash module M is carried through a door opening 9 of vehicle body 5.

Carrying apparatus 1 includes a support portion 11, a slide-fitted tool or sliding part 47, and a vehicle body clamp or fixing part 51. Support portion 11 basically includes a main frame 23, a pair of steering member grasping tools 27 and 29, and a support part 39. Support portion 11 holds and carries dash module M into the vehicle interior through door opening 9 of vehicle body 5. Carrying apparatus 1 also includes an assisting apparatus 13. Support portion 11 is supported by assisting apparatus 13 such that support portion 11 can be moved relative to vehicle body 5.

Throughout the carrying operation shown in FIG. 1, vehicle body 5 is transported by a conveyor, which is not shown in Figures. The conveyor serves as a transport apparatus to transport vehicle bodies in the direction of arrow A, which corresponds to the forward direction of vehicle body 5. Since conveyors for vehicle bodies are well known in the art, the structure and function of a conveyor would be obvious to one of ordinary skill in the art without further explanation herein. While vehicle body 5 is transported by the conveyor, support portion 11 and assisting apparatus 13 are also transported in a conventional manner in the same direction in synchronization with vehicle body 5 in order to perform the carrying operation.

Figure 2:
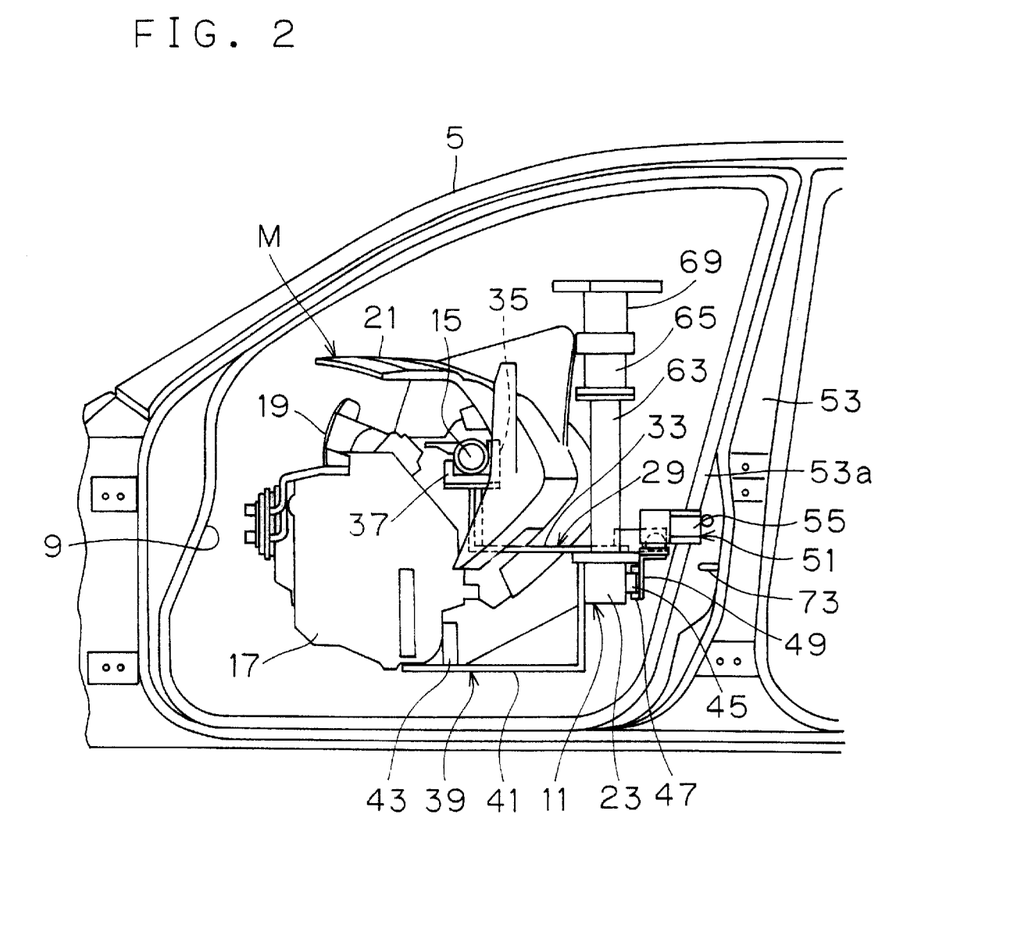
FIG. 2 is a side view of support portion of carrying apparatus in accordance with the first embodiment of the present invention through the door opening of the vehicle body, with doors being omitted.

FIG. 2 is a side view of support portion 11 in vehicle body 5 through door opening 9, with door 7 being omitted for purposes of illustrating carrying apparatus 1. Dash module M is sized in the traverse direction so as to fit the vehicle interior. Dash module M includes a steering member 15, which extends in the traverse direction of the vehicle, and various dash components surrounding steering member 15. These dash components installed therein include, but are not limited to, an air-conditioning unit 17, a duct 19, and an instrument panel 21, as well as an audio unit and an electrical system which are not shown in Figures. These dash components are pre-assembled to form dash module M.

Figure 3:
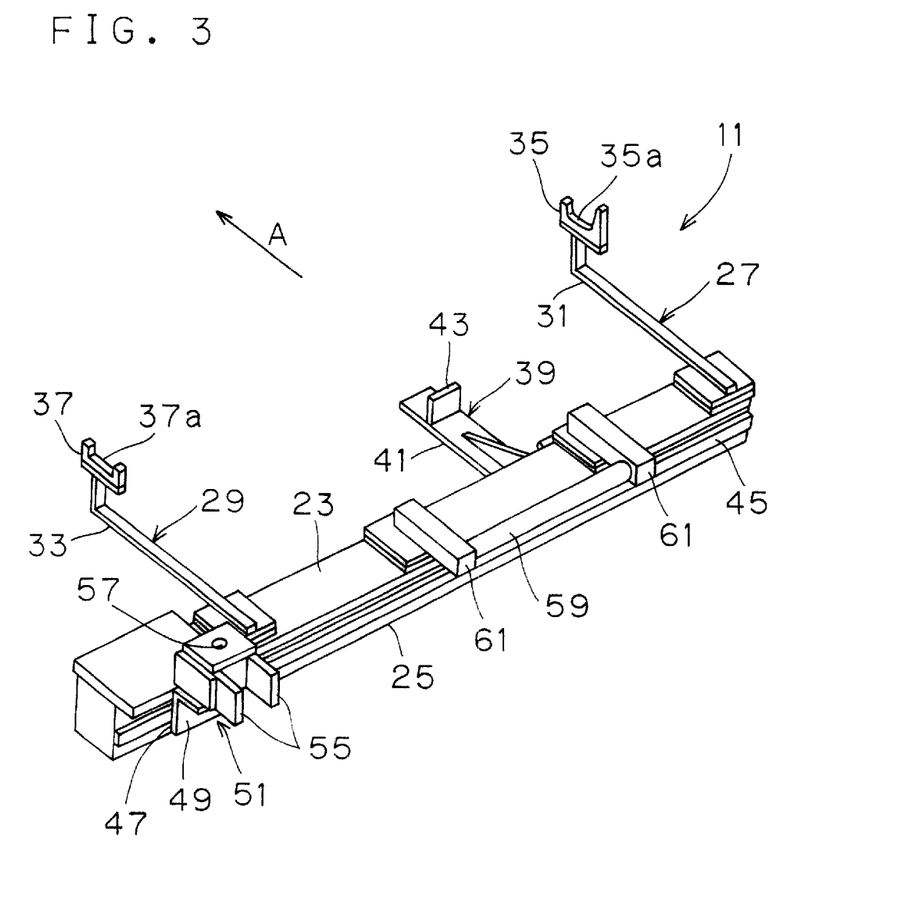
FIG. 3 is a perspective view of support portion of the carrying apparatus in accordance with the first embodiment of the present invention.

Referring to the perspective view of FIG. 3, main frame 23 of support portion 11 extends in a direction that is substantially parallel to a direction of a length of dash module M supported by support portion 11. The length of main frame 23 is roughly the same as that of dash module M. As seen in FIG. 3, steering member grasping tools 27 and 29 are mounted on an upper surface of right-support portion end and left-support portion end of main frame 23, respectively. In FIG. 3, the direction of arrow A corresponds to the forward direction of the vehicle.

Steering member grasping tools 27 and 29 respectively include arm parts 31 and 33 and grasping parts or grasping means 35 and 37. Arm parts 31 and 33 are substantially L-shaped and protrude in the forward direction relative to vehicle body 5. Grasping parts 35 and 37 are respectively provided on upper free ends of arm parts 31 and 33 to grasp steering member 15 of dash module M at near the ends of steering member 15. Grasping parts 35 and 37 are each provided with recessed parts 35a and 37a that accommodate steering member 15.

As best seen in FIG. 2, support part 39 of support portion 11 includes an L-shaped support plate 41 and a vertical plate 43. The L-shaped support plate 41 is fixed to a middle portion of main frame 23. The vertical plate 43 is fixed to an upper surface of an end of L-shaped support plate 41 and extends in a substantially vertical direction therefrom. Support part 39 is mounted to a front lateral surface of main frame 23 that faces the forward direction of the vehicle body 5. Support part 39 is positioned on main frame 23 off-center toward steering member grasping tool 27. As seen in FIG. 2, support part 39 supports a bottom of air-conditioning unit 17 with a front portion of support plate 41 and vertical plate 43. Besides, dash module M is grasped by steering member grasping tools 27 and 29. Therefore, dash module M is prevented from falling out of support portion 11, and held in a proper orientation.

A slide rail 45 is provided on a rear lateral surface of main frame 23 that faces a rearward direction of vehicle body 5. Slide rail 45 is provided integrally with and along the entire length of the lateral surface of main fame 23. Accordingly, slide rail 45 extends in a direction substantially parallel to the direction of the length of dash module M supported by support portion 11. As shown in FIG. 2, slide-fitted tool 47 is slidably coupled to slide rail 45 of main frame 23, such that slide-fitted tool 47 can slide along slide rail 45.

Slide-fitted tool 47 includes an L-shaped bracket 49. Vehicle body clamp 51 is fixedly mounted to slide-fitted tool 47 as a fixing part located on L-shaped bracket 49. Vehicle body clamp 51 engages a predetermined portion of vehicle body 5 so that main frame 23 and slide-fitted tool 47 can pivot about an axis oriented in a vertical direction relative to vehicle body 5. Vehicle body clamp 51 is pivotally coupled to slide-fitted tool 47 and bracket 49 via a support pin 57, which extends in a vertical direction relative to vehicle body 5. In other words, vehicle body clamp 51 is pivotable about support pin 57 relative to slide fitted tool 47 and its bracket 49, but not slidable relative to slide fitted tool 47 and its bracket 49. On the other support portion, slide-fitted tool 47 is slidable along slide rail 45, but not pivotable relative to slide rail 45. Therefore, vehicle body clamp 51 and slide rail 45 form a mounting portion that is slidable and pivotable relative to main frame 23. This pivoting occurs within a plane perpendicular to the direction in which support pin 57 extends, in other words, the vertical direction of vehicle body 5. Support portion 11 and dash module M are pushed into the vehicle interior through the sliding and pivoting.

More specifically, vehicle body clamp 51 is clamp-fixed to a predetermined portion of a flange 53a of a center pillar 53 of vehicle body 5. The position to which vehicle body clamp 51 is to be fixed varies depending on configuration of vehicles. While vehicle body clamp 51 is clamp-fixed to flange 53a, slide rail 45 can slide and pivot relative to flange 53a. Accordingly, main frame 23 of support portion 11, which is integrally formed with slide rail 45, is able to slide and pivot with respect to vehicle body clamp 51, and thus, with respect to vehicle body 5. As a result, by fixing vehicle body clamp 51 to flange 53, and sliding and pivoting with respect to slide rail 45, dash module M can pivot about vehicle body clamp 51 to enter the vehicle interior and move in a direction indicated by arrow B in FIG. 1 to be carried into the vehicle interior.

Structure of vehicle body clamp 51 will now be explained referring to FIG. 3. Vehicle body clamp 51 has a pair of clamp pieces or clamp means 55a and 55b, which can be moved toward and away from each other by a built-in cylinder mechanism (not shown) in a conventional manner. More specifically, clamp piece 55a is unmovable, while clamp piece 55b is movable by the built-in cylinder in the direction of arrow C as shown in FIG. 3. In this manner, clamp pieces 55 can clamp and unclamp flange 53a to fix and release vehicle body clamp 51 to and from flange 53a.

Referring still to FIG. 3, main frame 23 also includes an operation bar 59, which the operator grasps to operate support portion 11. Preferably, operation bar 59 is fixedly mounted to an upper portion of main frame 23 via a pair of holding blocks 61 in a position slightly off from the center of the main frame 23 in the direction of length toward steering member grasping tool 27.

Referring back to FIG. 1, support portion 11 is coupled to the aforementioned assisting apparatus 13. Assisting apparatus 13 includes a coupling rod 63, a main body 71, a primary arm 67, a secondary arm 65, and a rotational coupling shaft 69. More specifically, a lower end of coupling rod 63 is fixed to the upper surface of the left end of main frame 23. An upper end of coupling rod 63 is pivotally coupled to one end of secondary arm 65, such that secondary arm 65 is pivotable about a vertical axis of coupling rod 63. The other end of secondary arm 65 is pivotably coupled to a lower end of primary arm 67 via rotational coupling shaft 69. An axis of pivoting of rotational coupling shaft 69 runs in the vertical direction as seen in FIG. 1. Finally, an upper end of primary arm 67 is pivotally coupled to a top portion of assisting apparatus main body 71 about a horizontal axis such that primary arm 67 can pivotably move in the vertical direction.

Figure 4:
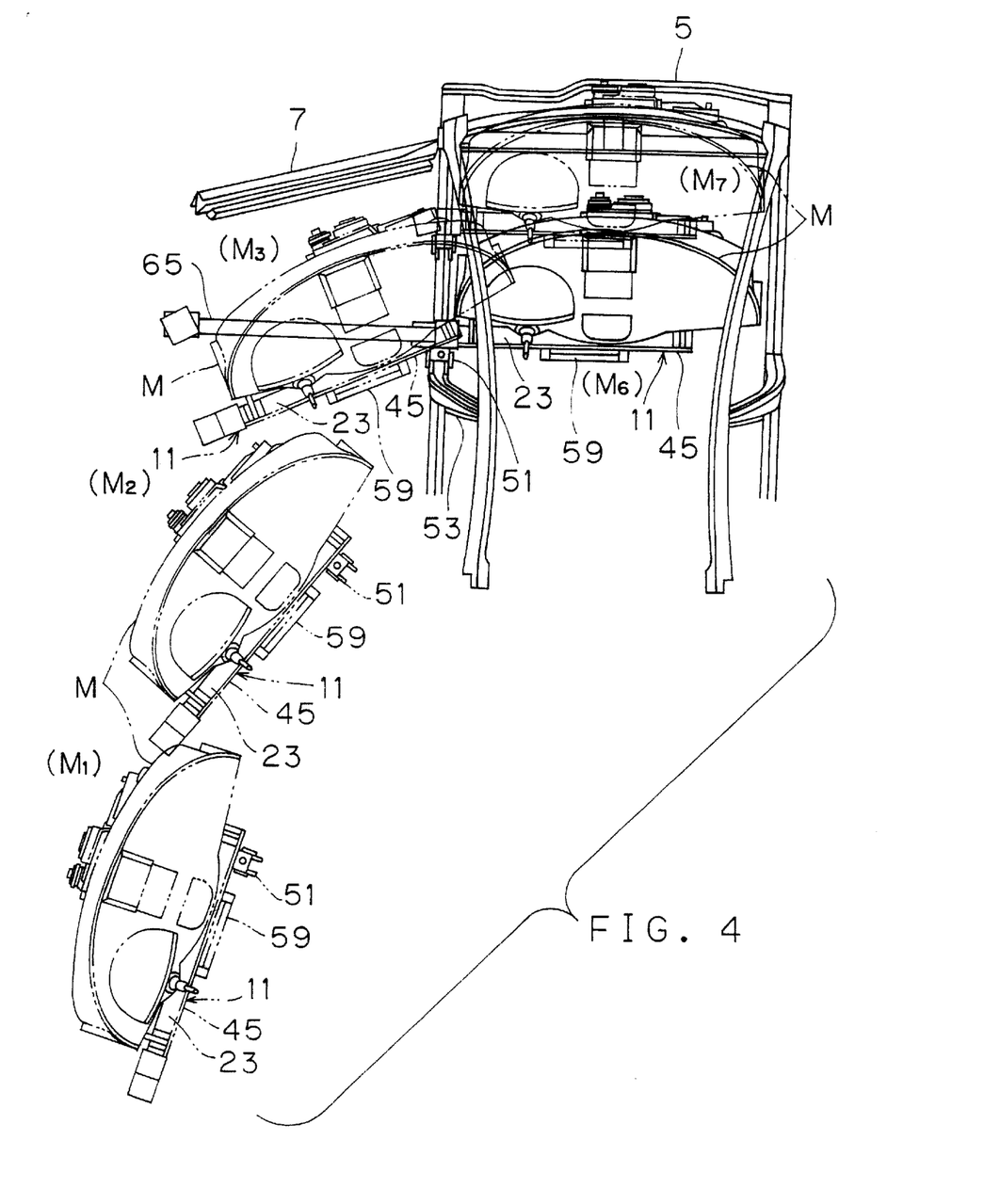
FIG. 4 is a motion-description view illustrating the carrying path of the dash module and the support portion when dash module is carried into the vehicle interior by the carrying apparatus in accordance with the first embodiment of the present invention.

When dash module M is carried into the interior of vehicle body 5, since door 7 is mounted to vehicle body 5, dash module M needs to be carried following a complicated path. As seen in FIG. 4, to perform the carrying operation, vehicle body clamp 51 is positioned on an end of slide rail 45 that will be first carried into vehicle body 5 through door opening 9. In the meantime, dash module M is transported toward vehicle body 5. Then, once vehicle body clamp 51 reaches near center pillar 53, the operator fixes vehicle body clamp 51 to a predetermined position of the periphery of center pillar 53 of door opening 9. Further, the operator grasps the operation bar 59 and moves support portion 11 with respect to assisting apparatus 13 such that dash module M follows the carrying path that will be described below.

Figure 5:
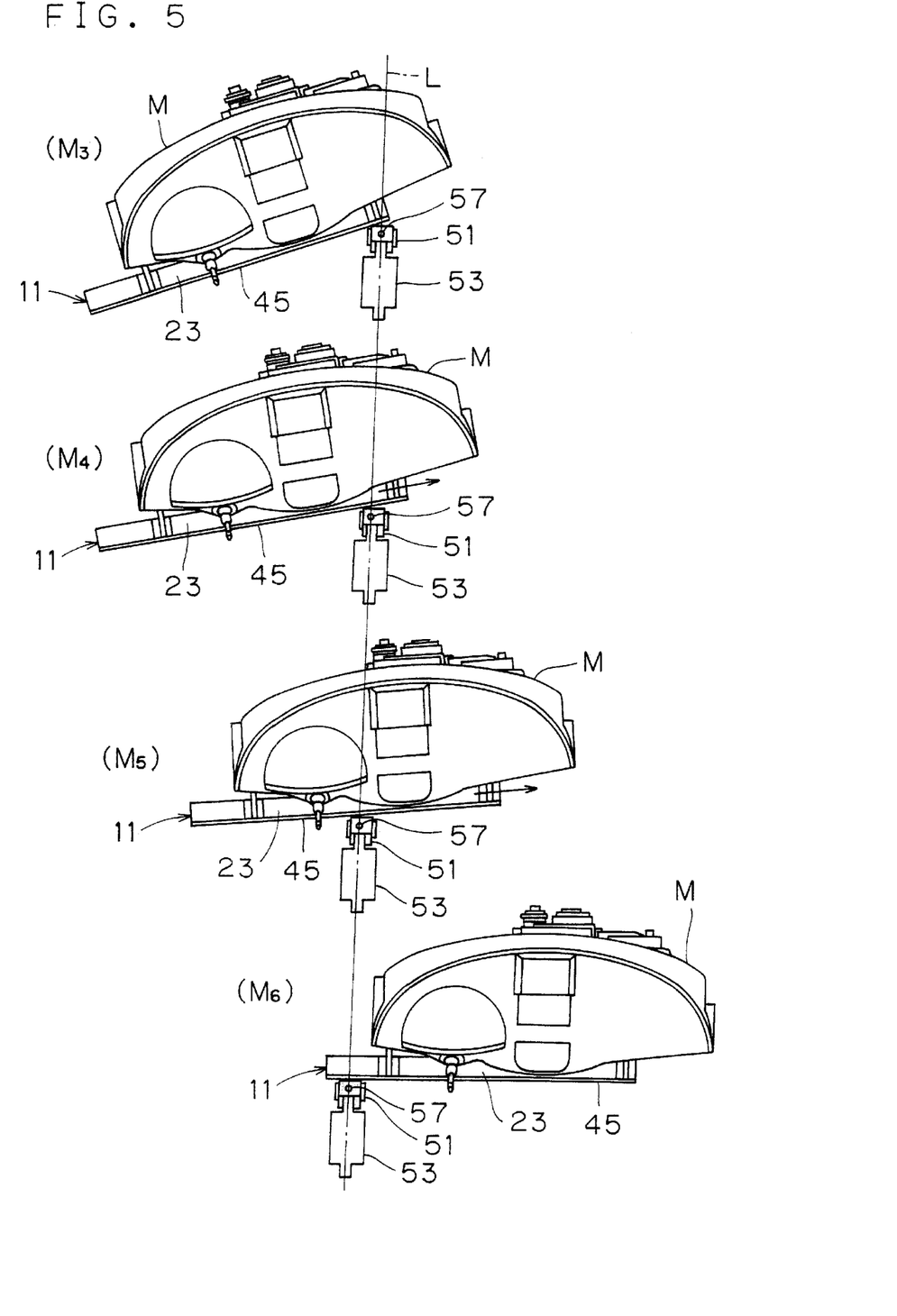
FIG. 5 is a simplified motion-description view illustrating the carrying path of the dash module and the support portion of the carrying apparatus in accordance with the first embodiment of the present invention, after an end of the dash module enters the door opening.

FIGS. 4 and 5 show the carrying path in a greater detail. Dash module M is moved from position M1, where dash module M is diagonally oriented with respect to vehicle body 5, to positions M2 and M3. In the meantime, dash module M gradually pivots in a clockwise direction as seen in FIG. 4. When dash module M comes to the vicinity of position M3, vehicle body clamp 51 is clamp-fixed to the predetermined vertical position on flange 53a of center pillar 53. In this manner, dash module M is positioned vertically such that dash module M aligns with the position on vehicle body 5 where dash module M is to be mounted. Besides, since the clamp-fixing operation is performed on a side of vehicle body 5 where the operator is positioned, the operator can perform the clamp-fixing operation easily.

As shown in FIG. 5, once the clamping operation is completed in position M3, dash module M moves to positions M4, M5 and M6. In the meantime, dash module M gradually pivots in the clockwise direction about rotational support pin 57 of vehicle body clamp 51, using the operation bar 59. Stated differently, a rear end of main frame 23 is brought frontward relative to vehicle body 5 as dash module M moves from the position M3 to the positions M4, M5 and M6. At the same time, slide rail 45 slides with respect to slide fitted tool 47 and vehicle body clamp 51 so that dash module M is pushed into the vehicle interior together with main frame 23. As seen in FIG. 5, the right support portion side of a vertical two-dot chain line L indicates the vehicle interior.

Vehicle body clamp 51 releases flange 53a when dash module M is positioned completely inside the vehicle interior and reaches the position M6, where dash module M directly faces its proper mounting position on vehicle body 5. Then dash module M is moved forward together with support portion 11 in order to be set in its proper mounting position on vehicle body 5, which is the position M7 shown in FIG. 4. Then, dash module M is mounted to vehicle body 5 in a prescribed manner utilizing a fastener. Since manners of mounting a dash module to a vehicle body are well known in the art, detailed operations of mounting a dash module to a vehicle body would be obvious to one of ordinary skill in the art without further explanation herein.

After dash module M is mounted to vehicle body 5, support portion 11 is lowered to be detached from dash module M, and moved toward the rear of vehicle body 5. Then, support portion 11 is retracted outside of the vehicle through door opening 9 in such a manner that support portion 11 does not interfere with door opening 9 or dash module M. After support portion 11 is retracted outside the vehicle, assisting apparatus 13 retreats to a waiting position, moving in the direction opposite the transport direction of vehicle body 5, in order to carry another dash module M for the next vehicle body 5.

With this carrying method for a dash module, support portion 11 is pushed into vehicle body 5, while support portion 11 is aligned with the periphery of door opening 9 by vehicle body clamp 51. Also, vehicle body clamp 51 is provided in such a manner that it can slide along slide rail 45. Therefore, dash module M can be carried into the vehicle interior without interfering with door opening 9.

With the carrying apparatus 1 described above, when an end of dash module M that is first carried into the vehicle interior slightly enters door opening 9, vehicle body clamp 51 is fixed to a predetermined portion of flange 53a of vehicle body 5. In this manner, vehicle body clamp 51 aligns the vertical position of support portion 11 with respect to vehicle body 5. Therefore, subsequent processes of pivoting and pushing dash module M into the vehicle interior can be conducted easily without causing an interference between dash module M and door opening 9, even when door 7 is mounted to vehicle body 5.

Furthermore, even when positions of vehicle bodies with respect to the conveyor are not consistent, the inconsistency does not affect the carrying operation, since the position of dash module M is aligned with respect to vehicle body 5 by support portion vehicle body clamp 51, which is clamped to a predetermined position on flange 53a.

Second Embodiment

Figure 6:
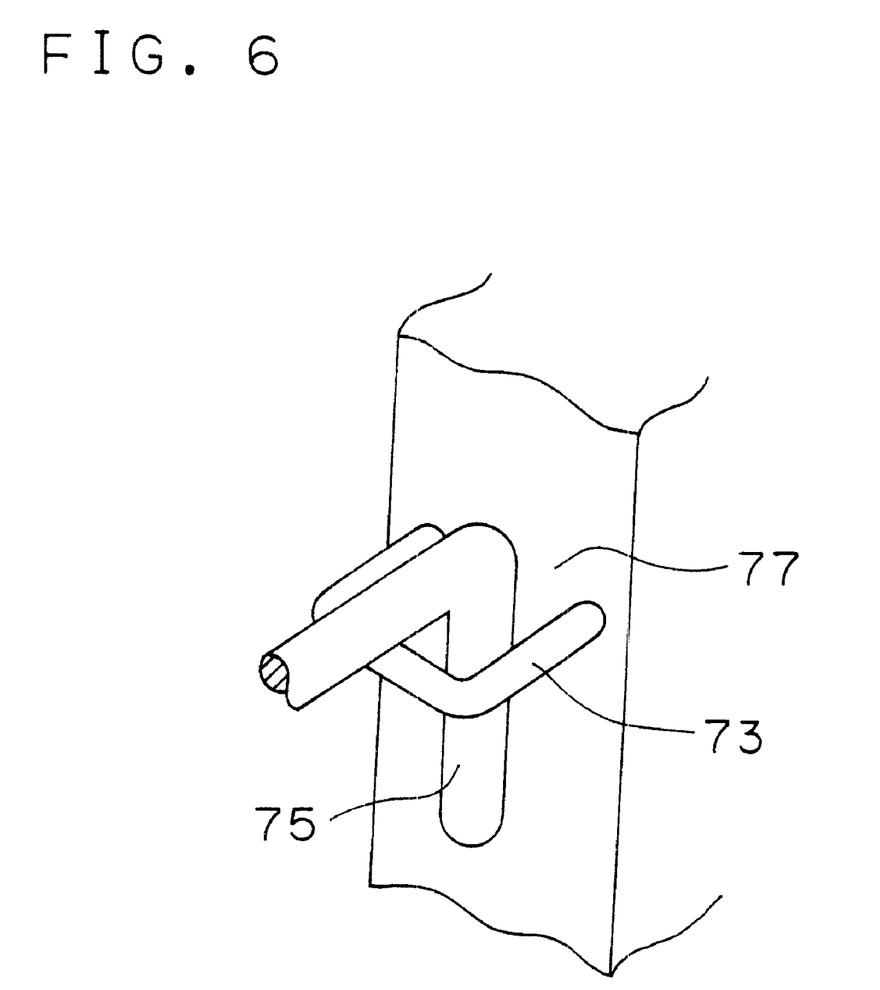
FIG. 6 is a perspective view of a fixing part of carrying apparatus in accordance with the second embodiment of the present invention, in which the fixing part is fixed to the vehicle body.

The second embodiment of the present invention will now be explained with reference to FIG. 6. In view of the similarity between the first and forgoing embodiments, components having the same function are given the identical reference numerals. Moreover, explanation of components and operations that function in a similar manner as in the first embodiment will be omitted. Only components and operations that are different in structure and function will be explained herein.

Basically, carrying apparatus 1' is identical to carrying apparatus 1, discussed above, except that vehicle body clamp 51 has been replaced with a hook or locator pin 75. In particular, the first embodiment has vehicle body clamp 51, which is clamp-fixed to flange 53a of vehicle body 5. In the second embodiment, hook or locator pin 75 is used to align support portion 11 with respect to vehicle body 5. More specifically, locator pin 75 shown in FIG. 6, instead of vehicle body clamp 51 is utilized as the fixing part. In other words, locator pin 75 is fixed to slide-fitted tool 47 along main frame 23. Since locator pin 75 can pivot relative to vehicle body 5 within space 77 formed between a striker 73 and vehicle body 5, main frame 23 can pivot about a vertical axis of locator pin 75. The fixing part or locator pin 75 in accordance with the second embodiment is fixedly coupled to vehicle body 5 by inserting locator pin 75 into a space 77 from above. Striker 73 is a part of a door lock mechanism shown in FIG. 2. In this case, since the vertical position of striker 73 is fixed relative to vehicle body 5, support portion 11 can be securely aligned in the vertical direction with respect to vehicle body 5. Furthermore, the fixing operation can be performed easily because the fixing operation only requires inserting locator pin 75 into space 77.

Additionally, the carrying operation can be performed through a right support portion side door opening of vehicle body 5, instead of a left support portion side door opening 9 shown in FIG. 1. In this case, assisting apparatus 13 supports support portion 11 from the right support portion side of the vehicle, instead of from the left support portion side as shown in FIG. 1.

Furthermore, it would be obvious to one of ordinary skill in the art from this disclosure that the carrying apparatus and the carrying method according to the present invention can be utilized regardless of whether the vehicle is a two-door vehicle or a four-door vehicle. Moreover, the carrying apparatus and the carrying method can also be utilized when doors are not attached to the vehicle body.

The terms of degree such as "substantially", "about" and "approximately" as used herein mean a reasonable amount of deviation of the modified term such that the end result is not significantly changed. These terms should be construed as including a deviation of ±5% of the modified term if this would not negate the meaning of the word it modifies.

This application claims priority to Japanese Patent Application No. H11-352329. The entire disclosure of Japanese Patent Application No. H11-352329 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A carrying apparatus for carrying an automobile dash module to an interior of a vehicle, said carrying apparatus comprising:
    a support portion being configured and adapted to carry the dash module into the interior of the vehicle through a door opening of a vehicle body, said support portion including a main frame extending in a longitudinal direction that is substantially parallel to a direction of a length of the dash module supported by said support portion;
    a sliding part slidably coupled to said main frame to slide in said longitudinal direction of said main frame; and
    a fixing part coupled to said sliding part and configured to engage a predetermined portion of the vehicle body so that said main frame and said sliding part pivot about a pivot axis oriented in a vertical direction relative to the vehicle body.

2. The carrying apparatus as set forth in claim 1, wherein said fixing part is pivotally coupled to said sliding part.

3. The carrying apparatus as set forth in claim 2, wherein said fixing part includes a pin forming said pivot axis about which said fixing part and said sliding part are pivotable relative to each other.

4. The carrying apparatus as set forth in claim 1, wherein said fixing part includes a clamp that is adapted to be clamp-fixed to a predetermined portion of the vehicle body.

5. The carrying apparatus as set forth in claim 1, wherein said support portion includes a slide rail on a surface of said main frame, said sliding part being slidably coupled along said slide rail.

6. The carrying apparatus as set forth in claim 1, wherein said fixing part includes a locator pin that is adapted to be inserted into a space formed between a striker of a door lock mechanism of the vehicle and the vehicle body so that said fixing part and said sliding part pivot about said locator pin.

7. The carrying apparatus as set forth in claim 1, further comprising
    an assisting apparatus that movably supports said support portion to move into the vehicle body.

8. The carrying apparatus as set forth in claim 1, wherein said support portion further includes a support part mounted on a lateral surface of said main frame and adapted to support the dash module.

9. The carrying apparatus as set forth in claim 1, wherein said support portion further includes an operation bar mounted on said main frame to allow an operator to operate said support portion.

10. A carrying apparatus for carrying an automobile dash module to an interior of a vehicle, said carrying apparatus comprising:
    supporting means for carrying the dash module into the interior of a vehicle through a door opening of a vehicle body;
    fixing and pivoting means for temporarily pivotally coupling said supporting means to a predetermined portion of the vehicle body about an axis oriented in a vertical direction relative to the vehicle body; and
    sliding means for allowing said supporting means to slide with respect to said fixing means.

11. The carrying apparatus as set forth in claim 10, wherein
    said fixing and pivoting means includes a pin about which said fixing and pivoting means and said supporting means are pivotable relative to each other.

12. The carrying apparatus as set forth in claim 10, wherein
   said fixing means includes clamp means for clamping to a predetermined portion of the vehicle body.

13. The carrying apparatus as set forth in claim 10, wherein
   said sliding means includes a rail arranged longitudinally on said supporting means.

14. The carrying apparatus as set forth in claim 10, wherein
   said fixing and pivoting means includes a locator pin that is adapted to be inserted into a space formed between a striker of a door lock mechanism of the vehicle and the vehicle body.

15. The carrying apparatus as set forth in claim 10, further comprising
   assisting means for movably supporting said supporting means into the vehicle body.

16. The carrying apparatus as set forth in claim 10, further comprising
   grasping means for supporting the dash module to prevent the dash module from falling off said supporting means, and
   operating means for manually moving said supporting means, said operation means being mounted on said frame means.

* * * * *